United States Patent
Schmid et al.

(10) Patent No.: US 9,067,728 B2
(45) Date of Patent: Jun. 30, 2015

(54) CONTAINER INCLUDING A MAGNETICALLY OPERATED SCRAPER

(75) Inventors: Jason W. Schmid, Sun Prairie, WI (US); Vernon D. Karman, Poynette, WI (US)

(73) Assignee: Clasen Quality Coatings, Inc., Madison, WI (US)

( * ) Notice: Subject to any disclaimer, the term of this patent is extended or adjusted under 35 U.S.C. 154(b) by 687 days.

(21) Appl. No.: 13/409,500

(22) Filed: Mar. 1, 2012

(65) Prior Publication Data

US 2013/0230372 A1 Sep. 5, 2013

(51) Int. Cl.
| B65G 54/02 | (2006.01) |
| B65D 88/60 | (2006.01) |
| B65G 19/04 | (2006.01) |
| B65G 69/08 | (2006.01) |

(52) U.S. Cl.
CPC .............. *B65D 88/60* (2013.01); *B65G 54/025* (2013.01); *B65G 19/04* (2013.01); *B65G 69/08* (2013.01)

(58) Field of Classification Search
CPC ........ B65G 54/025; B60L 13/04; B08B 9/04; B08B 9/043
USPC ............ 104/282; 198/619; 414/513, 514, 515
See application file for complete search history.

(56) References Cited

U.S. PATENT DOCUMENTS

| 2,298,982 | A | * | 10/1942 | Smith | 414/513 |
| 2,812,921 | A | * | 11/1957 | Leith, Jr. | 254/134.5 |
| 3,275,183 | A | | 9/1966 | Challenger | |
| 3,656,638 | A | * | 4/1972 | Hutton et al. | 414/518 |
| 3,828,988 | A | | 8/1974 | Berry | |
| 3,839,085 | A | * | 10/1974 | Hulvey et al. | 134/8 |
| 4,685,856 | A | * | 8/1987 | Hesse, Jr. | 414/515 |
| 4,721,235 | A | | 1/1988 | Watson | |
| 5,114,054 | A | | 5/1992 | Watson | |
| 5,341,726 | A | | 8/1994 | Watson | |
| 5,385,081 | A | | 1/1995 | Sneddon | |
| 5,537,929 | A | * | 7/1996 | Miura et al. | 104/156 |
| 5,746,112 | A | | 5/1998 | Watson | |
| 6,027,123 | A | | 2/2000 | Berry, Sr. et al. | |
| 6,145,444 | A | * | 11/2000 | Wilkinson | 104/138.1 |
| 6,206,248 | B1 | | 3/2001 | Popp et al. | |
| 6,250,230 | B1 | * | 6/2001 | Post | 104/281 |
| 6,325,384 | B1 | | 12/2001 | Berry, Sr. et al. | |
| 6,360,670 | B1 | * | 3/2002 | Schlienger | 104/156 |
| 6,571,934 | B1 | * | 6/2003 | Thompson et al. | 198/619 |
| 6,865,771 | B2 | | 3/2005 | Hanson | |
| 6,916,025 | B2 | | 7/2005 | Brisson | |

(Continued)

FOREIGN PATENT DOCUMENTS

FR 2908778 A1 * 5/2008 ............... C08K 3/22

*Primary Examiner* — James Keenan
(74) *Attorney, Agent, or Firm* — Reinhart Boerner Van Deuren s.c.

(57) ABSTRACT

There is provided a container for a bulk material. The container includes an elongated shell. A scraper assembly is configured to move within the shell. The scraper assembly further is configured to contact at least one interior wall of the shell. A driver assembly is located outside the shell and is configured to move along an outer surface of the shell. A driven assembly is located inside the shell and is coupled to the scraper assembly. Each of the driver assembly and driven assembly includes one of a magnet and a magnetically attractable material. Movement of the driver assembly, by a motion appliance, outside the shell causes a corresponding movement of the driven assembly and coupled scraper assembly inside the shell to move the bulk material inside the shell.

25 Claims, 12 Drawing Sheets

(56) References Cited

U.S. PATENT DOCUMENTS

| | | | |
|---|---|---|---|
| 7,147,423 B2 * | 12/2006 | Golden et al. | 414/510 |
| 7,159,508 B1 | 1/2007 | Birsner | |
| 8,197,175 B2 * | 6/2012 | Stewart et al. | 414/510 |
| 2002/0134793 A1 | 9/2002 | Coleman | |
| 2004/0195270 A1 | 10/2004 | Coleman | |
| 2007/0025833 A1 * | 2/2007 | Lutz | 414/514 |
| 2012/0295358 A1 * | 11/2012 | Ariff et al. | 436/47 |

\* cited by examiner

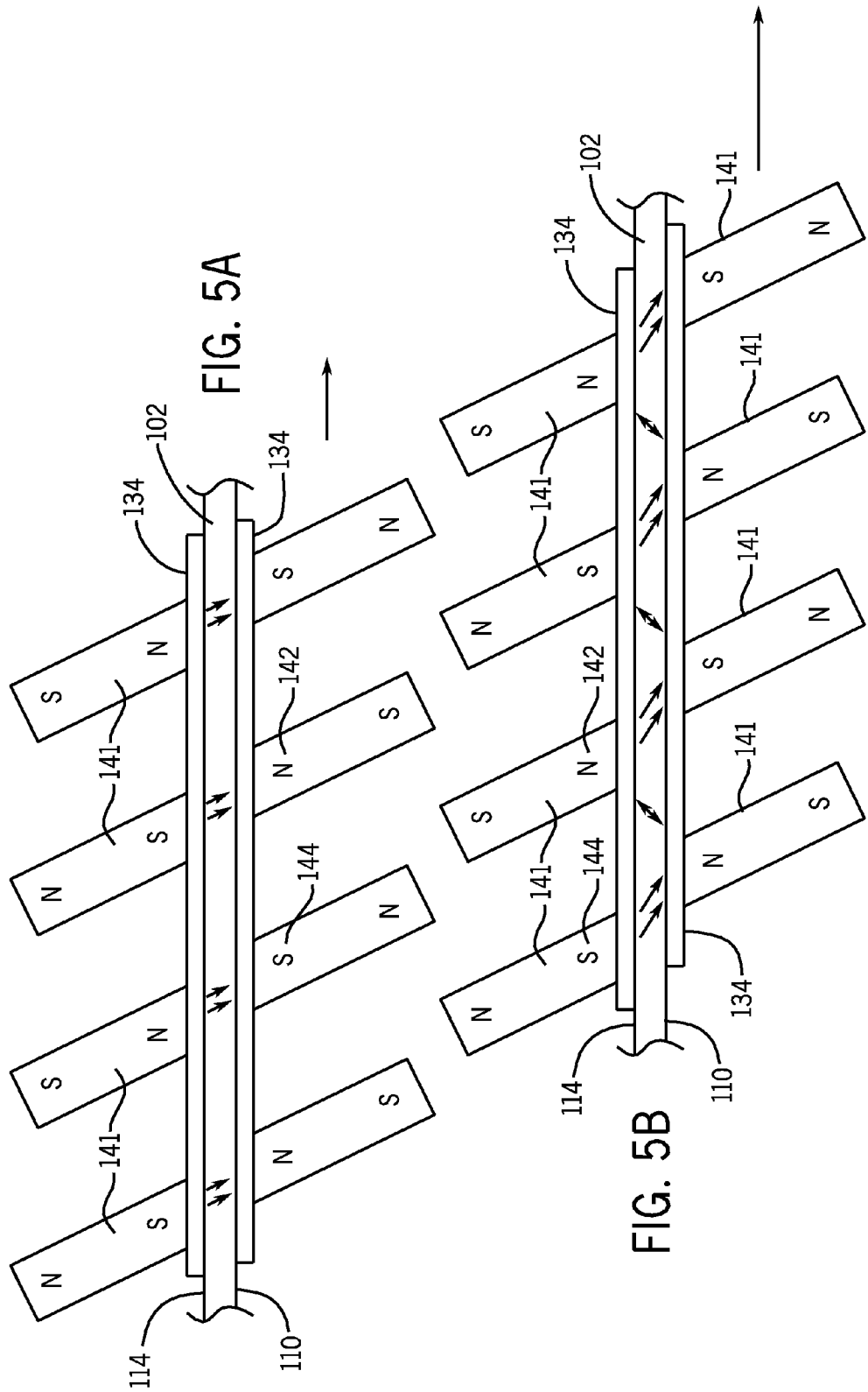

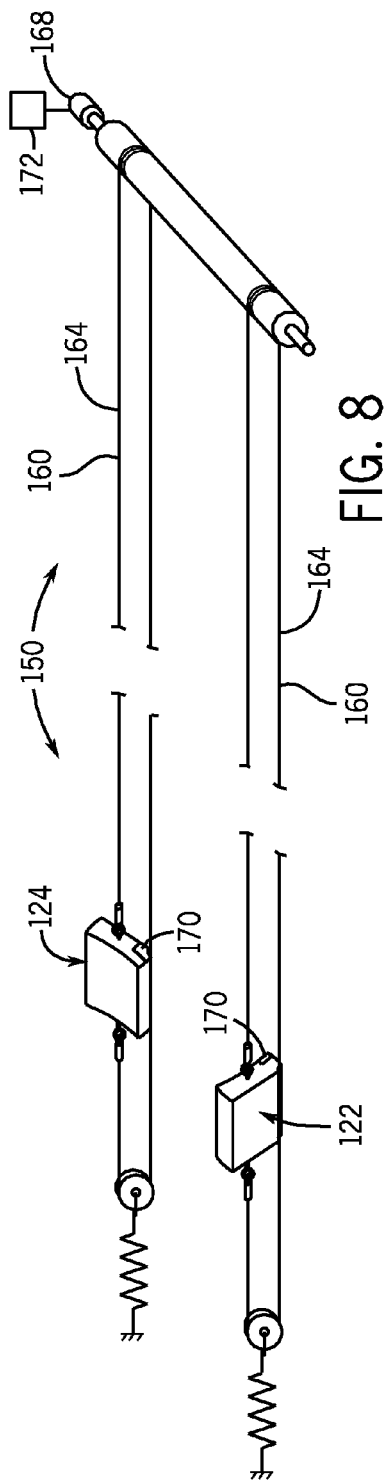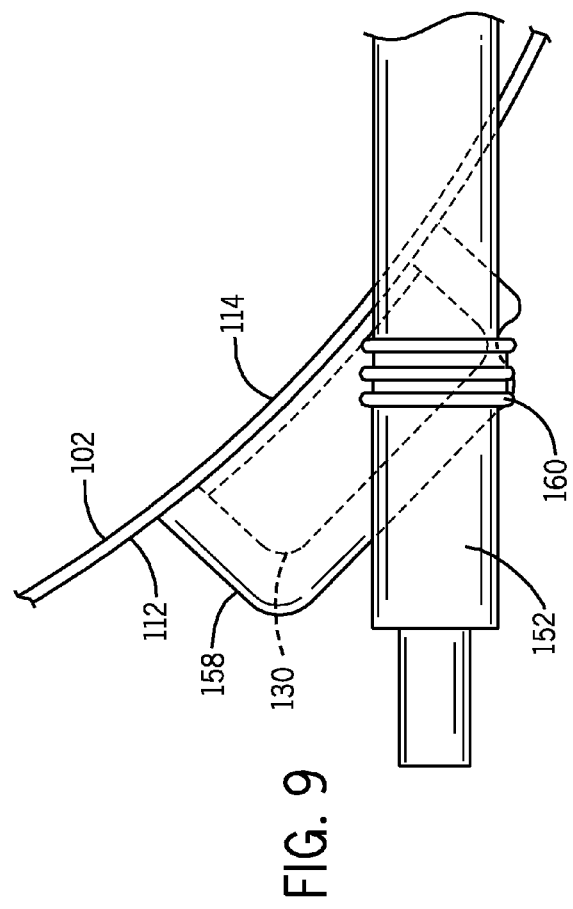

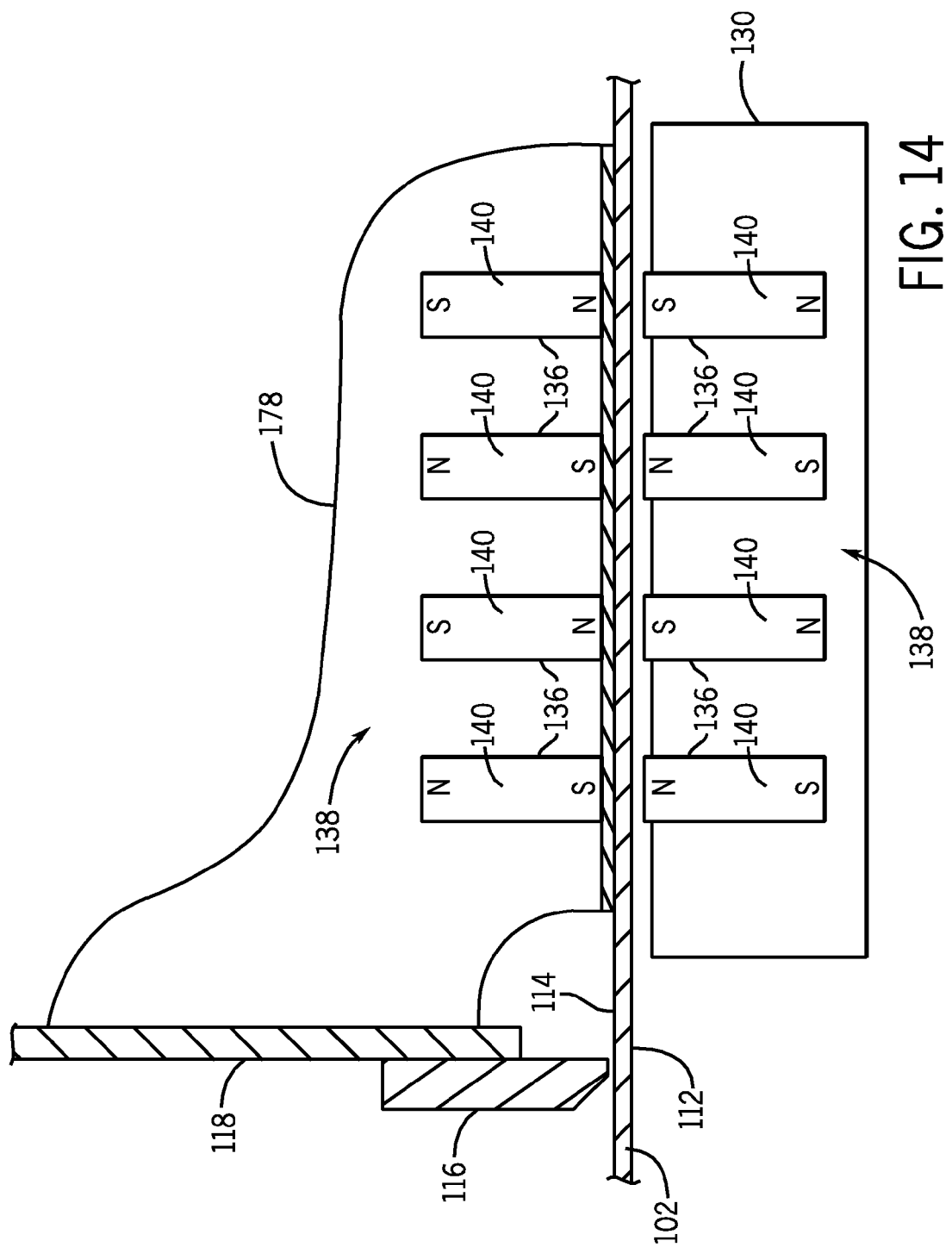

CONTAINER INCLUDING A MAGNETICALLY OPERATED SCRAPER

BACKGROUND OF THE INVENTION

Field of the Invention

The present invention relates to fluid transportation, and more particularly to moving viscous materials contained in a bulk transport tank.

Bulk material, particularly viscous materials are typically transported in a bulk tank truck. A typical bulk tank truck is a shell container mounted on the chassis of the truck or on a trailer that is coupled to a truck tractor. Viscous material is also transported in railroad tanker cars. Viscous materials such as comminuted and thick liquid food products, are typically transported in such vehicles. The bulk tanks are typically cylindrical and have a drain located at the bottom and at one end of the tank. A typical decanting operation relies on gravity to drain most of the contents of such bulk tanks; however with viscous materials, a substantial amount of such materials near the bottom of the tank will drain extremely slowly unless the draining of these viscous materials is assisted thus presenting a problem to commercial use of such bulk tank carriers.

It is known that one method of assisting the removal of residual viscous materials in a bulk tank is utilization of a piston mechanism located in the tank that urges any remaining viscous material towards the drain. Such piston mechanisms in bulk tanks are shown, for example in U.S. Pat. Nos. 6,027,123 and 6,325,384 which are owned by a transportation leasing corporation. Such piston mechanisms are generally effective, but also are expensive to fabricate, expensive to operate, expensive to maintain and substantially increase the difficulty of cleaning the inside of the bulk tank. It is also known that another method of assisting the removal of viscous materials in a bulk tank is to have a worker enter the tank to scrape the material to a drain port. Such procedure is expensive, dangerous for the worker and unsanitary.

In some circumstances, the viscous material in the bulk tank must be agitated periodically or constantly during transportation. Bulk tank vehicles having a piston are not configured or able to agitate the viscous material. Agitation by manual means is typically not practical.

The apparatus of the present disclosure must be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present disclosure.

There is provided a container for a bulk material. The container includes an elongated shell having a first end wall and a second end wall with an intermediate wall coupled to each of the end walls. A scraper assembly is configured to move between the first end wall and the second end wall within the shell. The scraper assembly further is configured to contact at least one interior wall of the shell. A driver assembly is located outside the shell and is configured to move along an outer surface of the shell. A driven assembly is located inside the shell and is coupled to the scraper assembly. Each of the driver assembly and driven assembly includes one of a magnet and a magnetically attractable material with a magnetic coupling established between the driver and driven assemblies. A motion appliance is coupled to the driver assembly and is configured to move the driver assembly along the outer surface of the shell. Movement of the driver assembly outside the shell causes a corresponding movement of the driven assembly and coupled scraper assembly inside the shell to extract the bulk material inside the shell.

In one embodiment, the driver assembly and driven assembly each includes a carriage. The carriage defines a slot angled in one of thirty degrees and sixty degrees from the vertical with at least one surface of the carriage configured with the same contour as one of the exterior wall and interior wall of the shell. In another embodiment the slot is configured at ninety degrees to one surface of the carriage. The carriage is configured to receive one of a magnet and a magnetically attractable material disposed in the slot of the carriage with one surface of one of the magnet and the magnetically attractable material configured with the same contour as the one surface of the carriage.

In another embodiment, the container for a bulk material includes at least one additional driver assembly located outside the shell and configured to move along an outer surface of the shell. There is at least one additional driven assembly located inside the shell and coupled to the scraper assembly. Each of the driver assembly and driven assembly includes one of a magnet and a magnetically attractable material with a magnetic coupling established between the driver and driven assemblies. This embodiment also includes at least one additional motion appliance coupled to the driver assembly configured to move the driver assembly along the outer surface of the shell. Such movement of the driver assembly outside the shell causes a corresponding movement of the driven assembly and the coupled scraper assembly inside the shell in coordination with the other driver assembly, driven assembly, and motion appliance.

The apparatus of the present invention is of a construction which is both durable and long lasting, and which will require little or no maintenance to be provided by the user throughout its operating lifetime. Finally, all of the aforesaid advantages and objectives are achieved without incurring any substantial relative disadvantage.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

DESCRIPTION OF THE DRAWINGS

These and other advantages of the present disclosure are best understood with reference to the drawings, in which:

FIGS. 5A-B is a schematic illustration of the driver and driven assemblies illustrated in FIG. 4 illustrating exemplary magnetic coupling between the driver and driven assemblies through the container;

FIG. 8 is a schematic illustration of a motion appliance coupled to a pair of driver assemblies and configured to operate with a guide member of the interior cleaning system of FIG. 1, including a cable-type force transfer member;

FIG. 9 is a detail illustration of the motion appliance illustrated in FIG. 8;

FIG. 14 is a side view illustration of the driver and driven carriages illustrated in FIG. 13 without a Halbach array of magnets in each carriage.

DETAILED DESCRIPTION OF THE EXEMPLARY EMBODIMENTS

Figure 1:
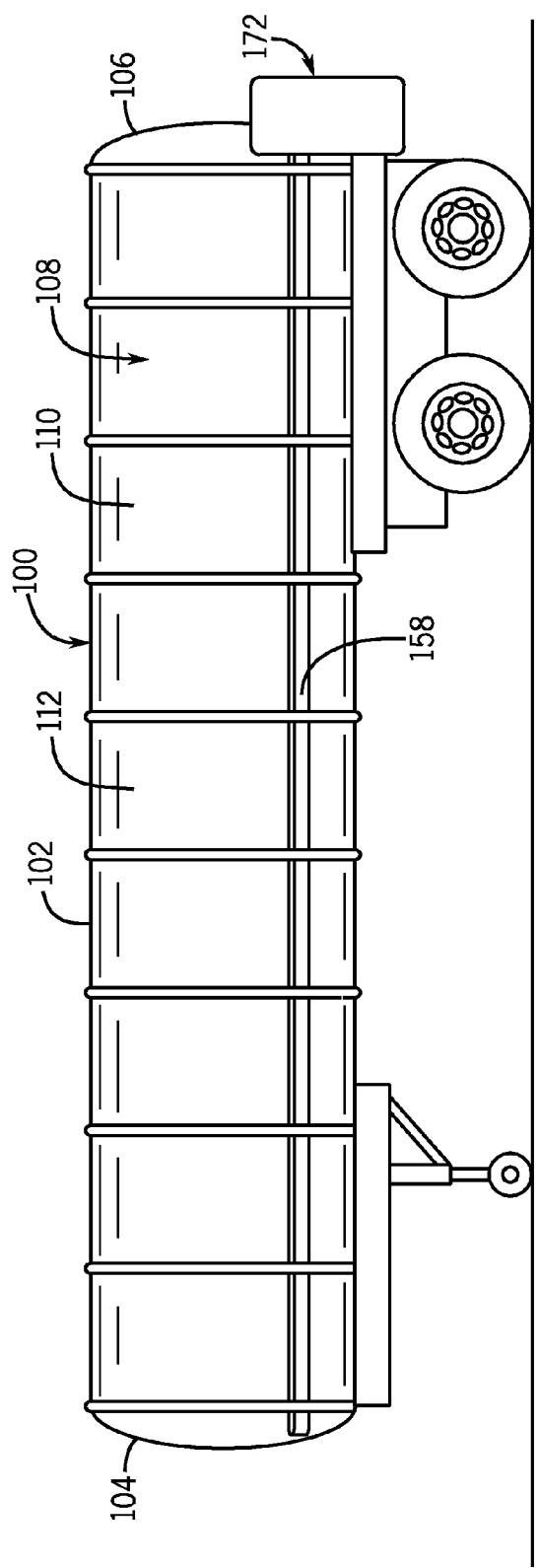
FIG. 1 is a plan side view of an exemplary embodiment of a container mounted on a trailer and including one of a container interior emptying system and a material agitating system.

Referring to the FIGS. 1-14, the present disclosure uses magnetic coupling to move an apparatus of a container 100 interior bulk material movement system without any electrical or mechanical energy mechanisms penetrating the shell 102 of the container 100. The drive apparatuses are external to the container 100.

In some situations, a container 100 contains a contamination-sensitive product such as an edible foodstuff. The interior of the container 100 should house only very simple, sanitary components, which may include encapsulated magnets which are kept separate from the foodstuff. Mechanical mechanisms using the disclosed apparatus, such as scrapers, mixers, and agitators, can be used to perform the desired function without having any direct physical connection with a motion appliance and associated drive mechanism that are external to the container 100.

There is disclosed a container 100 for storing and/or transporting a bulk material, such as foodstuff that includes an elongated shell 102, a scraper assembly 116 configured to move inside the shell 102, a driver assembly 122 located outside the shell 102, a driven assembly 126 located inside the shell and coupled to the scraper assembly 116 and a motion appliance 150 coupled to the driver assembly and configured to move the driver assembly 122 along the outside of the shell 102 wherein movement of the driver assembly 122 along the outer surface 112 of the shell 102 causes a corresponding movement of the driven assembly 126 and coupled scraper assembly 116 inside the shell 102 to move the bulk material, for example to agitate or extract, from or inside the shell.

Magnetic coupling between the driver assembly 122 and the driven assembly 126 permits the bulk material movement system to function for its intended purpose such as extraction, or agitation, or mixing of the bulk material contained in the container 100. It is found that for maximum magnetic coupling the use of rare earth magnets for both the internal driven assembly and external driver assembly 122, 126 provides the necessary advantage for the present disclosure. Rare earth magnets are strong permanent magnets made from alloys of rare earth elements. Rare earth magnets are the strongest types of permanent magnets made and produce significantly stronger magnetic fields then other types of ferrite or alnico magnets. There are two types of rare earth magnets, neodymium and samarium-cobalt magnets. Because of certain rare earth magnetic characteristics, typically rare earth magnets are plated or encapsulated with appropriate materials suitable for their intended use.

It is also found that in certain situations, the use of magnets in both the internal and external assemblies of the present disclosure, are appropriate. In other situations, it is appropriate to use a magnet in one of the internal or external assemblies and a magnetically attractable material used in the other one of the internal or external assemblies. For example, in some situations were elevated temperatures are to be experienced inside the container 100, a magnetically attractable material such as an iron component would be used with the rare earth magnet used in the external assembly. Such a situation is typically warranted because of the temperature sensitivity of rare earth magnets. It is submitted that one ordinarily skilled in the art would know when to use a magnetically attractable material rather than the rare earth magnet for the internal assembly.

Figure 13:
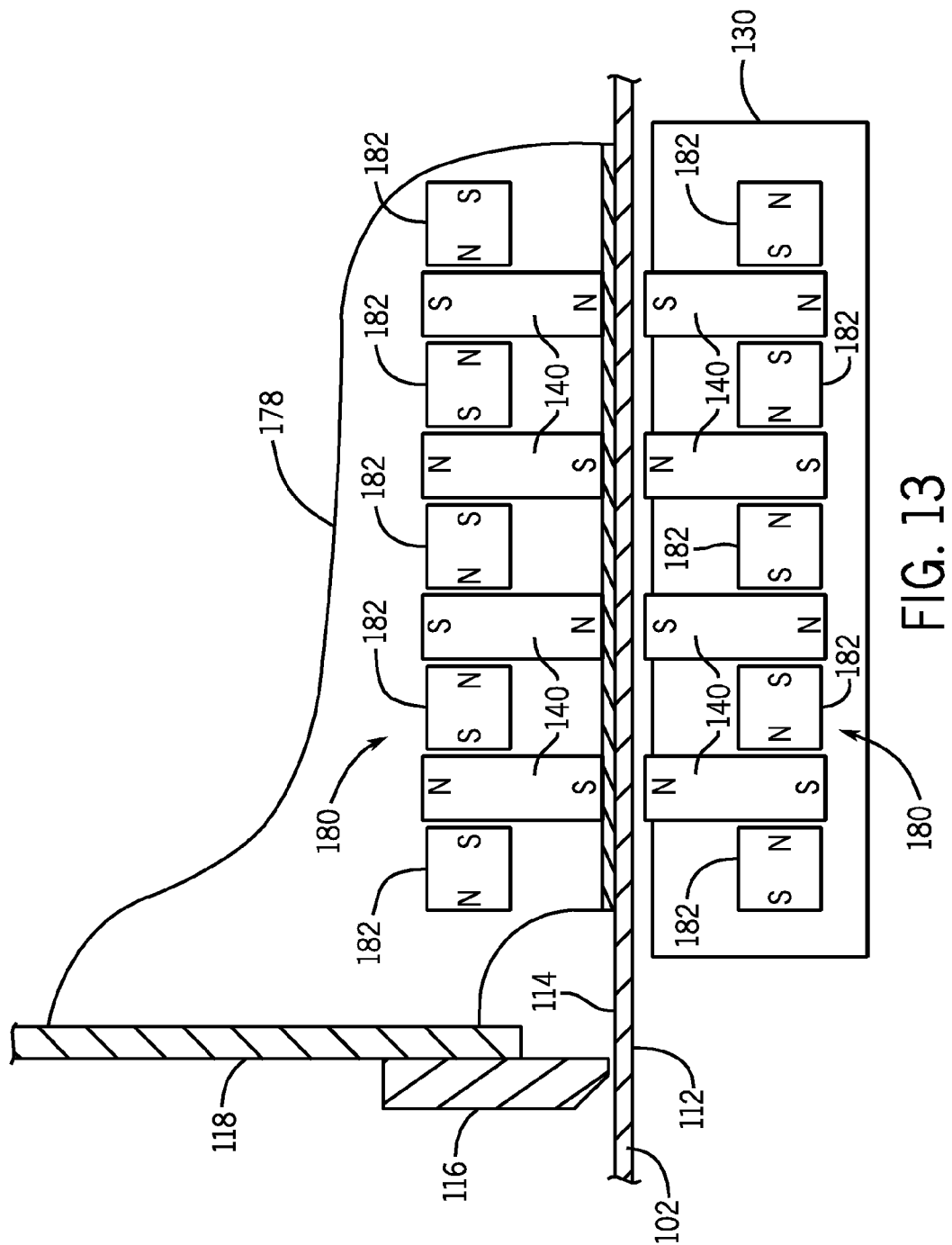
FIG. 13 is a side view illustration of a driven carriage and a driver carriage, each including a Halbach array of enhancement magnets disposed between a plurality of primary magnets and configured with opposite adjacent poles.

It has also been determined that the use of a single magnet, for example a large magnet, for both the internal and external assemblies is not practical. Very large rare earth magnets can be difficult and dangerous to handle because of the strong magnetic attraction. It has also been found that a single large rare earth magnet would not provide adequate positional control of the internal scraper mechanism. It is found that the use of multiple magnetic coupling points provides more stability of the internal assembly because the positioning of two or more points creates far more leverage and control than does a single point of magnetic coupling. In one embodiment a Halbach array 180 of enhancement magnets 182 are disposed between magnets 140 in each of the driven assembly 126 and driver assembly 122. Such configuration can be encapsulated in a low friction material 178. (FIG. 13)

As further discussed in this disclosure, the motion being generated to clear or agitate material in the interior of the container 100 is typically motion parallel to the intermediate wall 108 of the container shell 102. Having a single magnet or magnetically attractable material on the interior of the shell 102 and a single magnet on the exterior of the shell provides only a single point of magnetic coupling. The movement of the external magnet along the outside enclosure wall will tend to drag the inside magnet along the interior wall of the shell provided that the shear force parallel to the wall exceeds the static friction generated by clamping forces which are generated by magnetic force perpendicular to the shell wall.

In the case of a cylindrical magnet shape there is also a very noticeable "slip" as the outside magnet is moved along the wall since the generation of maximum shear force does not occur until there is a significant offset between the axes of the two magnets (inside and outside of wall). The degree of the slip can be noted by reversing the direction of motion of the external magnet and observing how much travel occurs in the opposite direction before the internal magnet reverses direction. The amount of the slip will definitely be impacted by the coefficient of friction of the thin material layers separating the magnet faces from the shell wall on both the interior and exterior. The frictional forces can be reduced, particularly on the external carriage assembly, by mounting the magnets in the carriage such that the face of the magnet is held a very small distance away from the exterior wall 110 and a set or rollers 174 with appropriate bearings are used to minimize the friction on the exterior 110 of the shell 102.

The same could be done for the interior driven carriage 122 but in cases where sanitary conditions are desired in the container 100, such rollers and bearings are not desirable. In those cases the driven carriage assembly 126 would be totally encapsulated in a food-grade low-friction polymer casting 178 which provides a very thin layer of the polymer between the magnet and the interior wall 114 of the shell 102 (See FIGS. 13 and 14). It should be noted that if these internal frictional forces parallel to the shell wall generated by the perpendicular magnetic coupling forces exceed the shear force associated with the magnetic coupling, then the coupling will be broken and the inner carriage will not track with the driver carriage 122 and the scraper functionality will be lost.

It is found that it is desirable to minimize the clamping force on the enclosure shell 102 and maximize the shear (dragging) forces that are parallel to the enclosure shell 102 of the container 100. The shape of the magnets in a multiple array and how they are arranged impacts a successful effect as herein disclosed. It is found that the ratio of shear force to clamping force is significantly improved as the magnet face dimension in direction of travel is minimized and magnet face dimension transverse to direction of travel is maximized. For example, a magnet with a face that is 0.5 inches in direction of travel and 3 inches transverse to direction of travel will provide a much improved ration of shear force to clamping force than would a magnet that is 1.0 inches in direction of travel and 1.5 inches transverse to travel even though the total mass of the magnet would be the same. Magnet depths measured parallel to the direction of magnetization would typically be in the 1 to 2 inch range based on magnet production limitations on this dimension. Greater magnet depths result in greater clamping and shear force capability.

Figure 4:
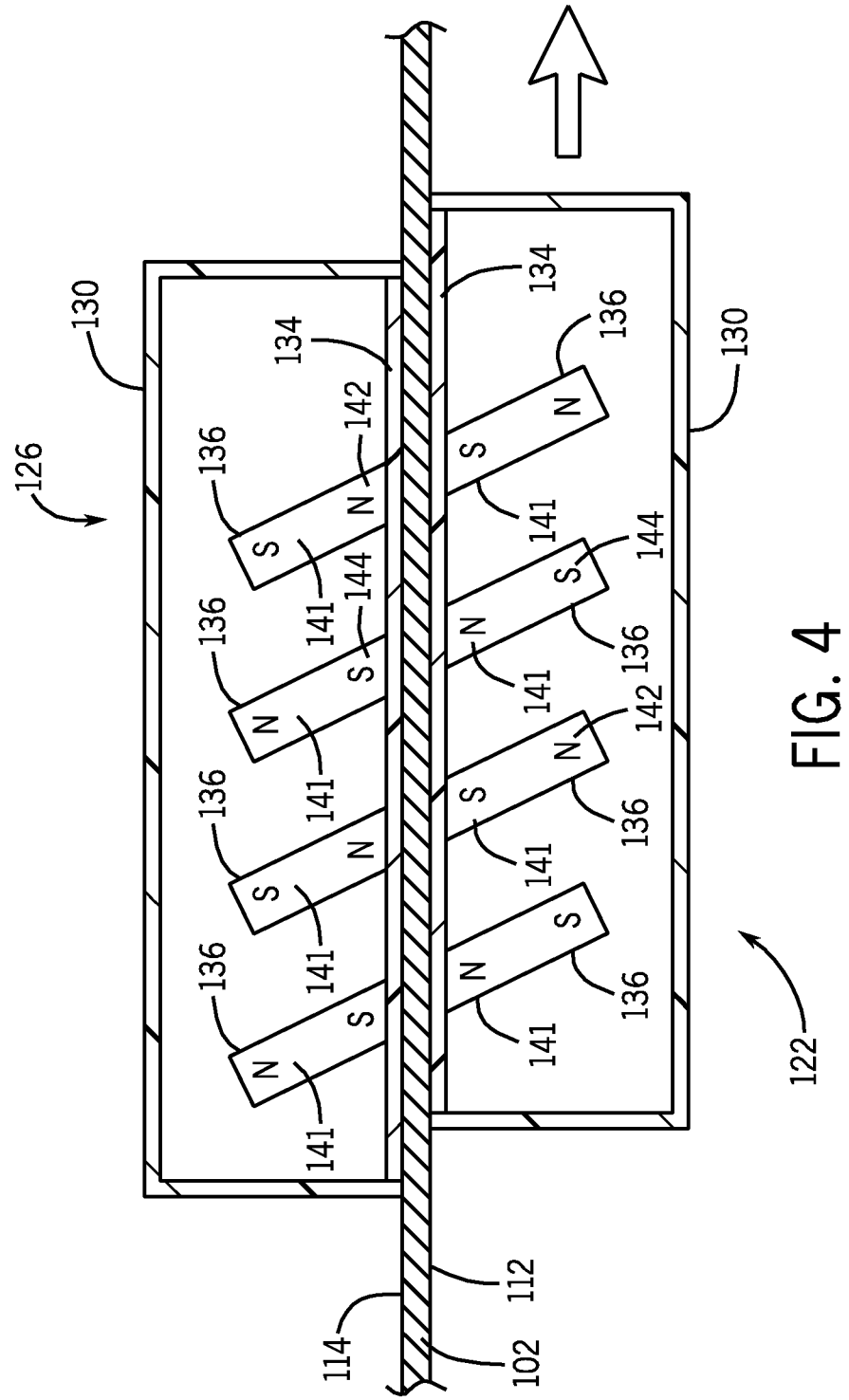
FIG. 4 is a schematic illustration of a driver assembly and a driven assembly of the system of FIG. 1 with each assembly including a plurality of defined slots and magnets in each slot.
Figure 7:
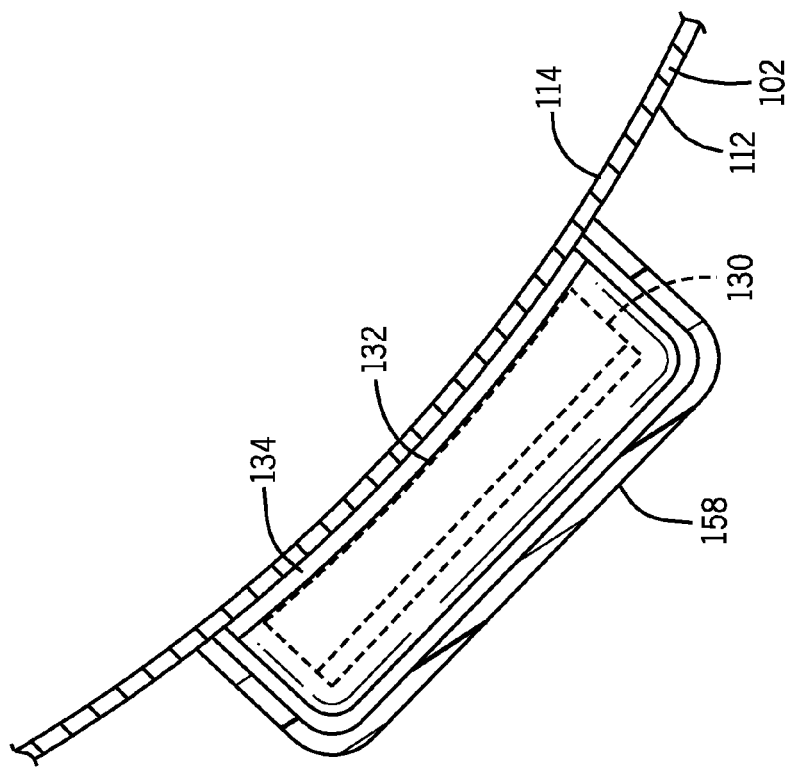
FIG. 7 is a cross-section view of a tube type guide member illustrated in FIG. 1 with a driver assembly carriage operatively disposed in the guide member.
Figure 6:
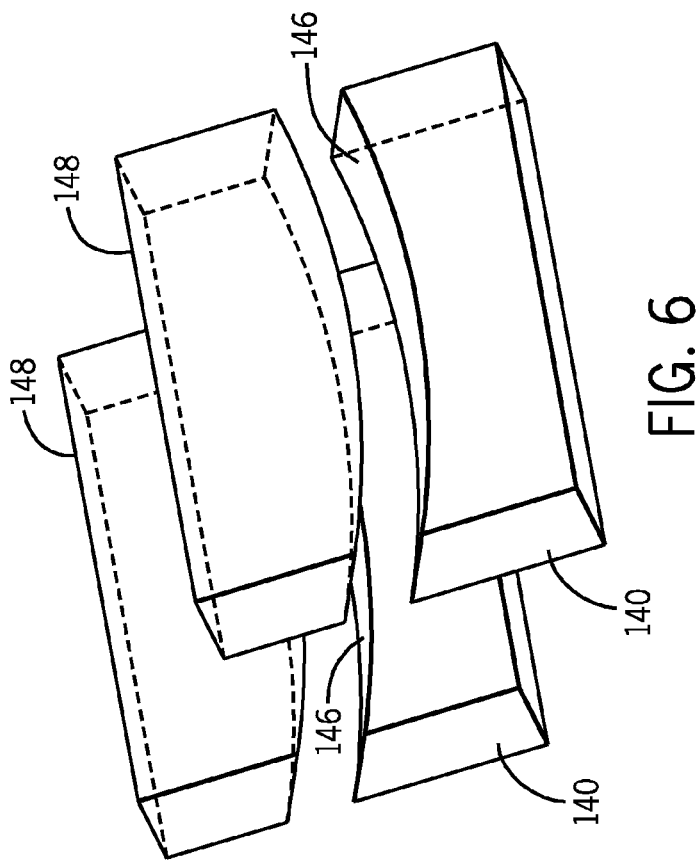
FIG. 6 is a perspective view of an exemplary embodiment of magnets in FIGS. 4, 5A, and 5B illustrating one surface of each magnet configured with the same contour as one surface of a carriage of each of the driver and driven assemblies illustrated in FIG. 4.

It has also been discovered that the space between the magnets is important in optimizing the shear force to clamping force ratio. A space equal or slightly larger than the magnet face width offers best results. For example, for the 0.5 inch by 3 inch magnets referred to above, a space between magnets of 0.5 to 0.75 inches would be used. In those cases where greater shear force is required to move the scraper assembly in one direction, results may be improved by slightly angling the magnets such that the axis of magnetization is not exactly perpendicular as shown in FIG. 4. Angles from perpendicular of zero to degrees could be used for these situations where maximum pull is only required in one direction.

Where equal pulls are required in both directions it is best to position the magnets with the axis of magnetization perpendicular to the shell wall 108. It has also been found that shear force can be magnified in a given carriage footprint by using a magnet configuration known as a Halbach Array (FIG. 13) whereby the space between the primary magnets 140 is filled or partially filled with magnets 182 having their axis of magnetization be perpendicular to the primary magnets. Such an arrangement will focus essentially all of the magnetic field from the primary magnets on one side of the array. This can approximately double the magnetic field strengths facing each other across the shell wall 108. While this doesn't really reduce the mass of the magnets required to provide a given pull strength, it does allow the magnet array to have a smaller footprint which allows for smaller carriages 130 both internal and external 122, 126 to the shell 102.

It has also been discovered that arranging several of these rectangular magnets is highly beneficial to maximizing the pull when they are clustered in the direction of pull with the magnets having their north 142 and south poles 144 alternating, for example in a four-magnet array for both the internal and external assemblies, the first and third magnets have their north poles 142 facing the enclosure wall on the outside of the enclosure and the second and fourth magnets have their south poles 144 facing the enclosure wall on the outside. The magnetic sequence on the inside of the enclosure assembly would be just the opposite where the first and third have their south poles 144 facing the enclosure wall and the second and fourth magnets have their north poles 142 facing the enclosure wall.

It has also been discovered that in some applications there is a benefit in having the magnets mounted at an acute angle relative to the container wall with the faces of the magnets shaped with a corresponding angle so that the face remains flat relative to the enclosure wall even though the axis of the magnet is at an acute angle. The magnets 140 are thus mounted to maximize the pull force parallel to the enclosure wall 108 in the direction where the maximum pull is desired. The extent of this angle and the spacing between the magnets can vary when it comes to maximizing the parallel pull while minimizing perpendicular pull which in turn decreases the amount of frictional drag created by the clamping force of the magnet on the enclosure wall. It is found that this angle can be between 30 and 90 degrees from vertical relative to the enclosure wall and that a typical rectangular shaped bar magnet would have dimensions of two by two by one-half inch. It should be understood though that any dimensions can be utilized for the bar magnet as is appropriate for the given application as determined by the user.

To assist in reducing the frictional forces between the magnets 140 and the container wall 108, a slide member 134 composed of a thin layer of low friction material such as Polytetrafluoroethylene (PTFE), for example Teflon® is coupled to the magnet assemblies and positioned between the magnet face and the enclosure wall which will not degrade the magnetic coupling force between the internal magnet array and the external magnet array and maximize the useful pull force for the cleaning system.

It is found that by alternating the poles, as described above, between the internal magnet array assembly and the external magnet array assembly provides both a pull and a push force as illustrated in FIG. 5B. The inner magnet is pulled by the outer magnet but it is also pushed by one of the outer magnets as illustrated by the arrows passing through the internal wall of the container 100. This arrangement results in a magnetic coupling effect that maximizes the parallel pull while minimizing the perpendicular clamping forces between the magnets.

FIG. 1 illustrates an exemplary embodiment of a container 100 mounted on a trailer. It should be understood that the container 100 can be mobile as illustrated in FIG. 1 but it may also be a nonmobile arrangement. The container 100 for bulk material, for example foodstuff, includes an elongated shell 102 having a first end wall 104 and a second end wall 106 with an intermediate wall 108 coupled to each end wall. As illustrated in FIG. 1, the container 100 may also include reinforcing ribs or bars placed along the length of the shell 102. It should be understood that some containers 100 may not include the external reinforcement ribs or stiffener rings.

FIG. 1 also illustrates an exemplary embodiment of a guide member 154 which is positioned alongside and parallel to the exterior wall 110 of the shell 102. The guide member 154 extends the length of the shell 102. In some applications, the guide member may be longer than the shell 102 and in some instances it may be less than the full length of the shell 102 as determined by the user for a particular application.

Figure 2:
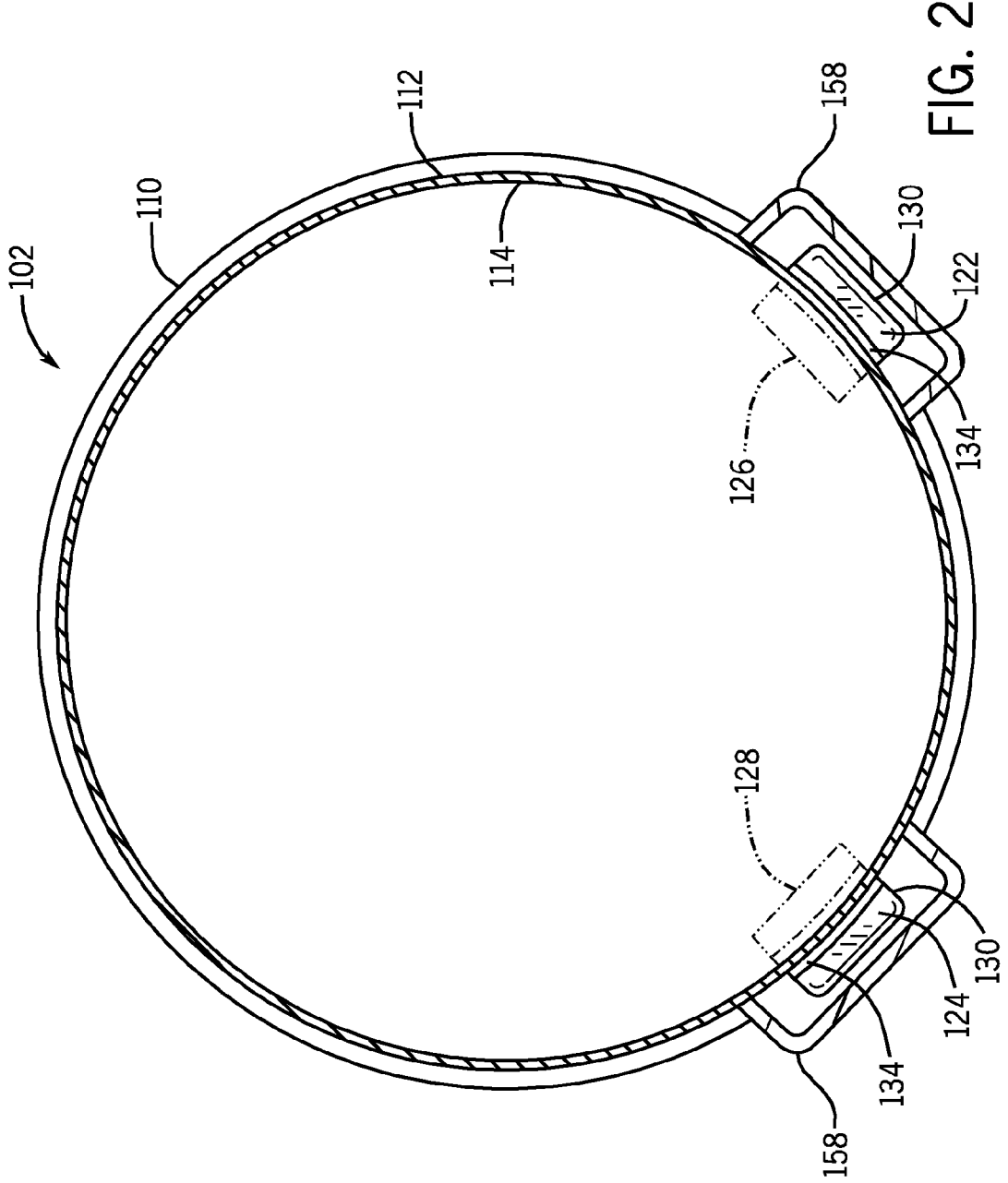
FIG. 2 is a cross-section of the container illustrated in FIG. 1.
Figure 3:
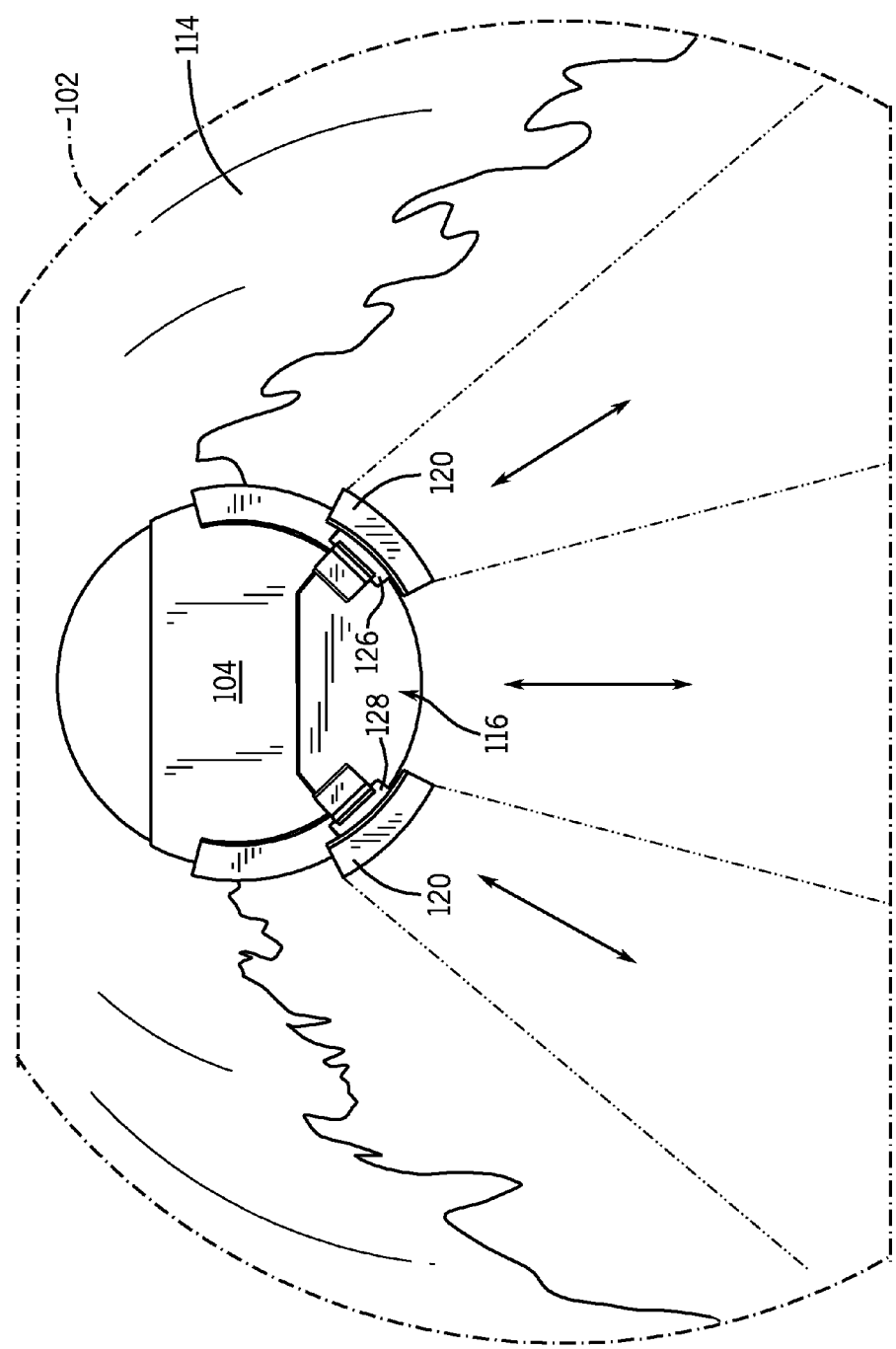
FIG. 3 is an interior view of the container illustrated in FIG. 1 exposing a scraper assembly of the interior emptying system and a material agitating system.

As illustrated in FIG. 2, a typical configuration of the container 100 is an elongated shell 102 that defines a circular interior diameter. It should be understood that the shell 102 can define an oval interior cross-section. FIG. 3 illustrates the interior of the shell 102 of the container 100. The interior wall 114 is the interior surface of the intermediate wall 108 of the container 100.

FIG. 3 illustrates an exemplary embodiment of a scraper assembly 116 which is positioned in the interior of the container 100. The scraper assembly 116 is configured to move between the first end wall 104 and the second end wall 106 within the shell 102. The scraper assembly 116 is configured to contact at least one interior wall 114 of the shell 102. The scraper assembly includes a framework 118 and flexible or low-friction semi-rigid material 120 which is coupled to the framework with the flexible or low-friction semi-rigid material configured to conform to the contour (typically actuate) of the interior wall 114 of the shell 102 and is orientated substantially perpendicular to the interior wall 114.

The cross-section of the container 100 can be any suitable shape, with typical cross-sections being one of circular and oval. When the scraper assembly 116 is moved from one end wall 104 to the second end wall 106 within the container 100 the flexible or low-friction semi-rigid material 120 pushes and scrapes any bulk material or a substantial portion of any bulk material that remains in the container 100 after a majority of the bulk material has been removed from the container 100, typically by a pump or gravity. The scraper assembly 116 is an agitator or mixer, when it is moved back and forth within the shell 102 to agitate the bulk material in the shell 102.

The scraper assembly 116 can be configured such that the flexible or low-friction semi-rigid material 120 extends around all or part of the interior wall 114 of the shell 102. In some instances where the bulk material voluntarily flows down the side walls of the shell the scraper may only extend to cover the bottom 25 percent of the interior wall. In some instances where the bulk material is more viscous and sticky the scraper 116 might extend to cover the entire circumference of the interior wall 114 of the shell 102. In the illustrated embodiment the scraper 116 extends over about 55% of the interior wall. However, it should be understood that the flexible or semi-rigid material, coupled to the framework 118 can also be configured to contact the entire circumference of the interior wall 114 of the shell 102 of the container 100 with the orientation still substantially perpendicular to the interior wall 114.

The scraper assembly 116 is attached to the driven interior carriage 126 assembly by one of several means. In some instances the driven assembly 126 may be constructed as an extension of the scraper assembly framework 118. In instances where the bulk material is a foodstuff the scraper assembly 116 and the driven assembly 126 would typically be totally encapsulated in a food-grade low friction polymer material casting 178. In those instances the scraper and the carriage may be joined together prior to encapsulation so as to avoid sanitary design issues at the point of attachment. In other case the encapsulated scraper assembly and the encapsulated carriage assembly may also be magnetically coupled with the coupling magnets arranged close to the surface of the polymer where they adjoin each other.

A driver assembly 122 is located outside the shell 102 and is configured to move along an outer surface 112 of the shell 102. A driven assembly 126 is located inside the shell and is coupled to the scraper assembly 116. Each of the driver assembly 122 and the driven assembly 126 includes one of a magnet 140 and a magnetically attractable material 148. A magnetic coupling is established between the driver and driven assemblies 122, 126. As described above, the driver assembly 122 and the driven assembly 126 may each contain a magnet 114 in an appropriate application.

Each of the driver assembly 122 and the driven assembly 126 includes a carriage 130. The carriage defines a slot 136 with at least one surface 132 of the carriage configured with the same contour as one of the exterior wall 110 and the interior wall 114 of the shell 102. One of the magnet 140 and a magnetically attractable material 148 are disposed in the slot with one surface 146 of one of the magnet and the magnetically attractable material configured with a contour similar to that of the shell wall. In the case of small diameter shells and rather long magnets the distance between the magnets gets quite large unless the magnets are cut to a curved profile essentially matching the curvature of the shall. In the case of shorter magnets and larger shall diameters the distance between the magnets stays reasonably short even if the face of the magnet is flat. Cutting of the magnets to match a curved profile has been found to best be done with a waterjet cutter to avoid thermally damaging the magnet.

In an exemplary embodiment, the carriage includes a u-shaped channel, for example aluminum or stainless steel, configured to receive slot-defining members, for example wood, plastic or other non-magnetic material. The exemplary embodiments of the carriage includes a plurality of slots 138 with the slots configured to receive one of a magnet 140 and a magnetically attractable material 148 or alternatively a magnet in each of the plurality of slots 138. The slots are configured perpendicular to the intermediate wall 108 of the shell 102 or at a predetermined angle relative to the wall 108 of the shell 102. For example, the slot is aligned with one surface 132 of the carriage 130 at an angle of thirty degrees from being perpendicular to the wall 108 of the shell 102. See FIG. 4. In another embodiment, the slot 136 is aligned with one surface 132 of the carriage 130 at an angle of zero degrees from being perpendicular to the wall 108 of the shell 102.

The angle of the slots is determined by the specific application to which the interior bulk material movement system is to be applied and the type of bulk material that is to be removed from the container 100, as determined by the user of the apparatus disclosed herein. It should be understood that the slots 138 can be machined into the slot-defining members or molded during fabrication. It is also contemplated that the carriage 130 can be a single integral piece and may be encapsulated with appropriate coatings for the intended use. The magnets 140 may be retained in the carriage 130 by magnet retainer strips or clips 176.

As discussed above and as illustrated in FIG. 6, a bar magnet 141 is configured in a rectangular shape with the surface to be aligned with the intermediate wall 108 of the shell 102 of the container to have the same contour, typically actuate, as one of the exterior wall 110 and interior wall 114 of the shell 102. It will be these surfaces that correspond to the contour of the intermediate wall 108 of the shell 102. In summary the bar magnet will be rectangular in shape with one of its long sides contoured with the same radius as the exterior wall 110 or interior wall 114 of the shell 102 of the container 100 with the same face cut to align the bar magnet at an angle between zero degrees and thirty degrees from being perpendicular relative to the intermediate wall 108 of the shell 102. See FIGS. 4 and 6. The slide member 134 covers the contoured faces of the magnets positioned in the carriage 130 and facilitates the sliding of the carriage forming part of the driver assembly 122 and the driven assembly 126.

A motion appliance 150 is coupled to the driver assembly 122 and configured to move the driver assembly 122 along the outer surface 112 of the shell 102 of the container 100. Movement of the driver assembly 122 outside the shell 102 causes the corresponding movement of the driven assembly 126 and the coupled scraper assembly 116 inside the shell 102 to move any residual bulk material inside the shell 102 to a discharge port of the container 100. The motion appliance includes a guide member 154 positioned alongside and parallel to the exterior wall 110 of the shell 102. The guide member 154, in at least one embodiment, extends at least the full length of the shell 102. The guide member is configured to receive and guide the driver assembly 122 along the exterior wall 110 of the shell 102.

Figure 10:
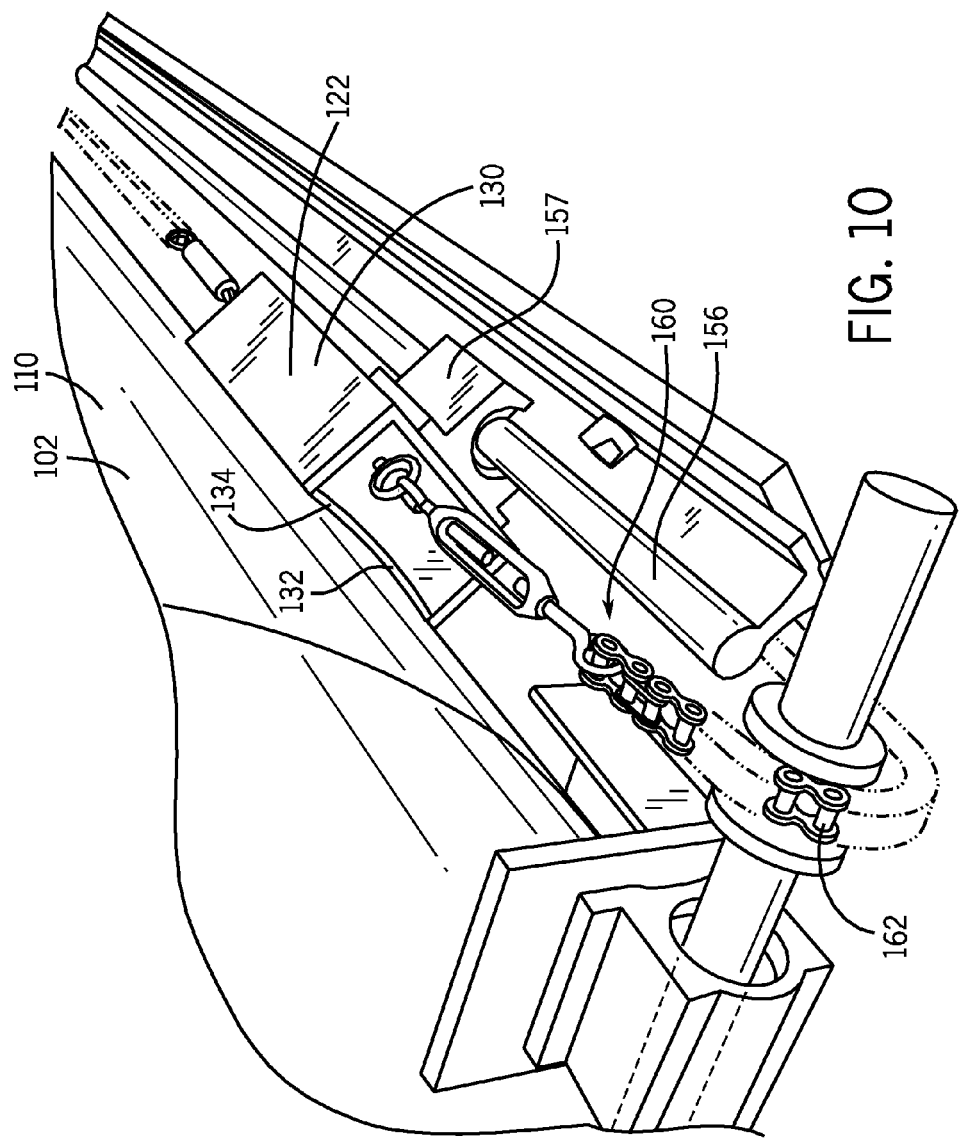
FIG. 10 is a perspective view of a driver assembly slidingly coupled to a rail-type guide member, including a chain-type force transfer member.
Figure 11:
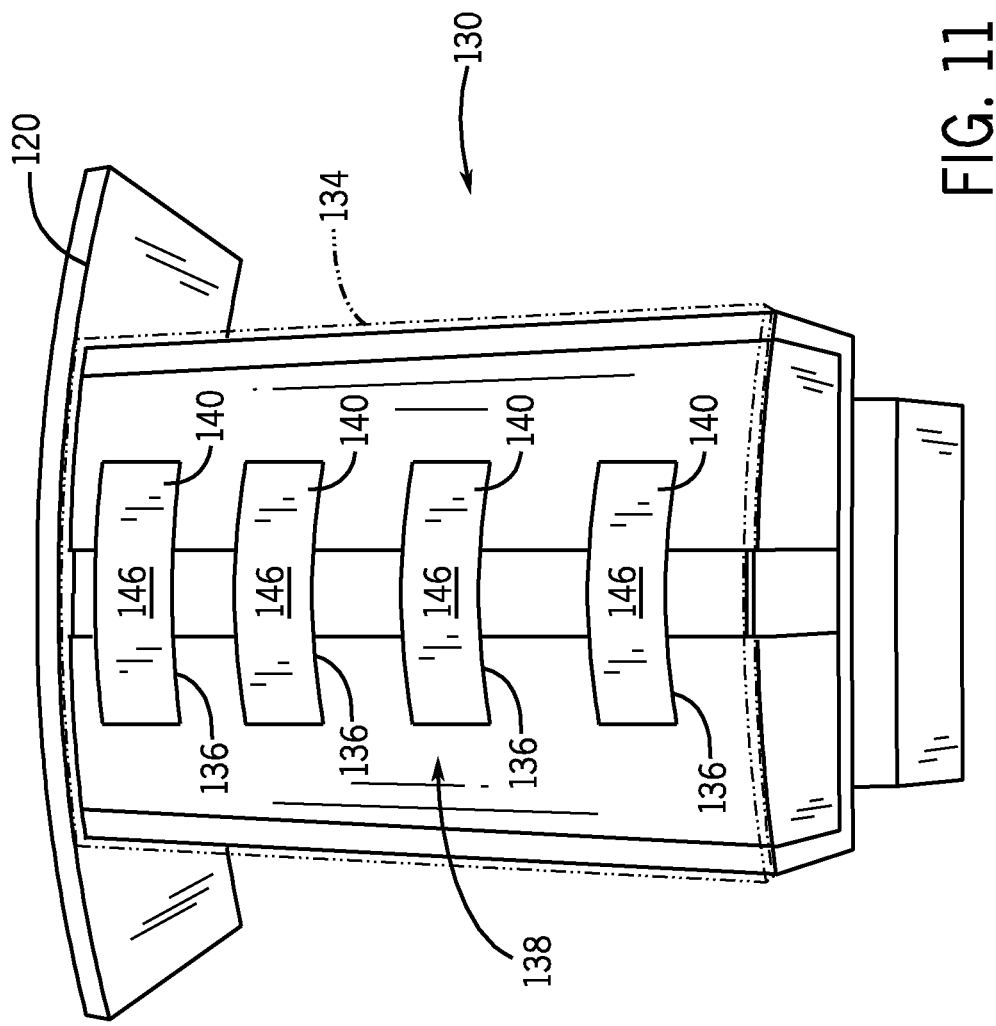
FIG. 11 is a perspective view of an exemplary embodiment of a driven assembly configured with a plurality of bar magnets disposed in a plurality of slots defined in a carriage.
Figure 12:
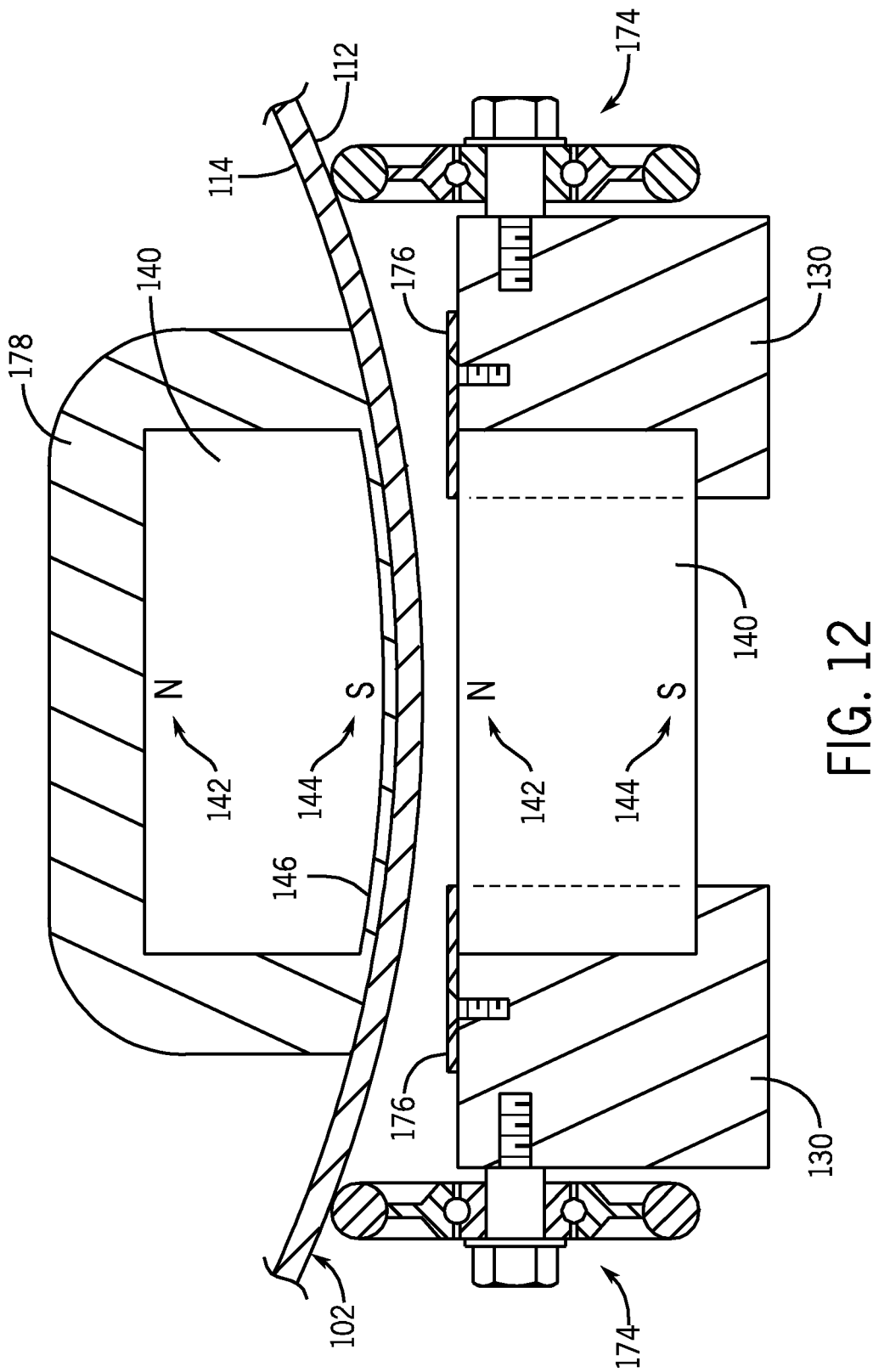
FIG. 12 is a schematic end section illustration of a carriage pair, with a driven carriage magnet configured with a surface contour approximating the interior wall of the container shell and with the driven carriage including anti-friction guide rollers.

The motion appliance 150 includes a force transfer member 160 which is coupled to a motor 168 and the driver assembly 122. In one embodiment, the motor is a hydraulic motor. In another embodiment the motor is an electric motor and can be either an AC or DC electric motor. In another embodiment the motor is a pneumatic motor. The type of motor 168 is determined by the user and must be suitable for the given application. The force transfer member 160 can be one of a chain 162, a cable 164, and a timing belt. FIG. 8 illustrates an exemplary embodiment of a motion appliance 150 with an illustrated force transfer member 160 of the cable type 164. FIG. 10 illustrates an exemplary embodiment of a motion appliance 150 in which the force transfer member 160 is of the chain-type 162.

In one embodiment, the guide member 154 is coupled to the exterior 110 wall of the shell 102. (See FIG. 1). The guide member 154 illustrated in FIG. 1 is a tube through which the driver assembly 122 and associated force transfer member 160 moves. See FIGS. 2, 7, and 9. The housing at the back end of the guide member illustrated in FIG. 1 contains the force transfer member traction axle which is coupled to the motor 168. In some configurations the motor 168 may be coupled to a gear-train configured to adjust the speed of the scraper assembly 116. The pulled and returned length of the force transfer member 160 extends through the guide member 154. At the opposite end of the assembly, a pulley with a biasing member, such as a compression spring maintains tension in the force transfer member 160 particularly during the movement procedure.

In another embodiment of the motion appliance 150 as illustrated in FIG. 10 the guide member 154 is a rail 156. The driver assembly 122 includes one or more guide brackets 157 which are configured to engage with, in a sliding manner, the rail 156. As the force transfer member 160 pulls the driver assembly 122 the driver assembly 122 moves along the rail 156. The rail 156 is positioned proximate the exterior wall 110 of the shell 102 of the container such that when the driver assembly 122 moves, the carriage 130 of the driver assembly 122 maintains contact with the exterior wall 110 of the shell 102 of the container 100.

In each case of the above-described motion appliances 150, a driven assembly 126, coupled to the scraper assembly 116 is positioned within the shell 102 of the container 100 and magnetically coupled to the driver assembly 122 of the two described motion appliances.

A position sensor 170 is coupled to one of the driver assembly 122 and driven assembly 126. A position sensor 170 provides the user with the position of the scraper assembly 116 within the interior of the container 110. A controller 172 is coupled to the motion appliance 150 and the position sensor 170. The controller 172 controls the position of the scraper assembly 116 inside the shell 102. It is contemplated that the controller 172 can be programmed to operate automatically when certain conditions and parameters are met or can be a manually operated controller as determined by the user of the apparatus disclosed herein. The position sensor 170 can be of any convenient and conventional sensor that will indicate the position of the scraper assembly 116 relative to the length of the shell 102 of the container 100.

In another embodiment, at least one additional driver assembly 124 is located outside the shell 102 and configured to move along the outer surface 112 of the shell 102. At least one additional driven assembly 128 is located inside the shell 102 and coupled to the scraper assembly 116. Each of the additional driver assembly 124 and additional driven assembly 128 includes one of a magnet 140 and a magnetically attractable material 148 (which may be another magnet) wherein a magnetic coupling is established between the driver and driven assemblies 122, 124, 126, 128. Such embodiment will include at least one additional motion appliance 152 coupled to the respective driver assemblies and configured to move the driver assemblies along the outer surface of the shell 102. Movement of the driver assembly outside the shell causes a corresponding movement of the driven assembly and coupled scraper assembly inside the shell in coordination with the other driver assembly and driven assembly and motion appliance. See FIG. 8 for an illustration of such an arrangement.

The controller 172 may be a microprocessor coupled to the various apparatus of the system. The controller 172 may also be a server coupled to an array of peripherals or a desktop computer, or a laptop computer, or a smart-phone. It is also contemplated that the controller is configured to control each individual machine and may be remote from any of the apparatus. Communication between the controller 172 and the various apparatus may be either by hardwire or wireless devices. A memory/data base coupled to the controller may be remote from the controller 172.

The controller 172 typically includes an input device, for example a mouse, or a keyboard, and a display device, for example a monitor screen or a smart phone. Such devices can be hardwired to the controller or connected wirelessly with appropriate software, firmware, and hardware. The display device may also include a printer coupled to the controller 172. The display device may be configured to mail or fax reports as determined by a user. The controller 172 may be coupled to a network, for example, a local area network or a wide area network, which can be one of a hardwire network and a wireless network, for example a Bluetooth network or internet network, for example, by a WIFI connection or "cloud" connection.

For purposes of this disclosure, the term "coupled" means the joining of two components (electrical or mechanical) directly or indirectly to one another. Such joining may be stationary in nature or moveable in nature. Such joining may be achieved with the two components (electrical, magnetic, or mechanical) and any additional intermediate members being integrally formed as a single unitary body with one another or the two components and any additional member being attached to one another. Such adjoining may be permanent in nature or alternatively be removable or releasable in nature.

Although the foregoing description of the present mechanism has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the mechanism as described herein may be made, none of which depart from the spirit or scope of the present disclosure. The particular embodiments and applications were chosen and described to provide the best illustration of the principles of the mechanism and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A container for a bulk material, comprising:
   an elongated shell having a first end wall and a second end wall and an intermediate wall extending around a longitudinal axis and coupled to each end wall;
   a scraper assembly configured to move between the first end wall and the second end wall within the shell, the scraper assembly further configured to contact at least one interior wall of the shell;
   a driver assembly located outside the shell and configured to move along an outer surface of the shell;
   a driven assembly located inside the shell and coupled to the scraper assembly, wherein each of the driver assembly and driven assembly includes one of a magnet and a magnetically attractable material, wherein a magnetic coupling is established between the driver and driven assemblies; and
   a motion appliance coupled to the driver assembly and configured to move the driver assembly along the outer surface of the shell, wherein movement of the driver assembly outside the shell causes a corresponding movement of the driven assembly and coupled scraper assembly inside the shell to move the bulk material inside the shell;
   wherein the driver assembly and driven assembly each comprise:
      a carriage defining a slot with at least one surface of each carriage configured with the same contour as one of the exterior wall and interior wall of the shell; and
      one of a magnet and a magnetically attractable material disposed in each slot with one surface of one of the magnet and the magnetically attractable material configured with the same contour as the one surface of the carriage;
   wherein the carriage of the driven assembly is encapsulated in a polymer casting with a layer of polymer between the magnet and an interior wall of the shell.

2. The container for a bulk material of claim 1, wherein the elongated shell defines one of a circular interior diameter and an oval interior cross-section.

3. The container for a bulk material of claim 1, further comprising a layer of polymer between the magnet and the intermediate wall of the shell.

4. The container for a bulk material of claim 1, wherein the scraper assembly movement in the shell results in one of agitation and extraction of the bulk material.

5. The container for a bulk material of claim 1, with the scraper assembly comprising:
   a framework; and
   a flexible material coupled to the framework, with the flexible material configured to conform to the contour of the interior wall of the shell and orientated substantially perpendicular to the interior wall.

6. The container for a bulk material of claim 5, wherein the flexible material extends over at least 25 percent of the interior wall of the shell.

7. The container for a bulk material of claim 1, wherein each slot is aligned with the one surface of the carriage at an angle of ninety degrees from perpendicular to the intermediate wall of the shell.

8. The container for a bulk material of claim 1, wherein the carriage defines a plurality of slots with one of the magnet and the magnetically attractable material disposed in each slot;
   wherein the magnet extends a first distance in a first direction parallel to the longitudinal axis and extends a second distance in a second direction perpendicular to the longitudinal axis and wherein the second distance is greater than the first distance.

9. The container for a bulk material of claim 8, wherein all of the slots contain a bar magnet, with the bar magnets arranged with alternating poles aligned toward the intermediate wall of the shell.

10. The container for a bulk material of claim 9, further comprising a Halbach array arrangement, wherein an enhancement magnet is disposed between the bar magnets with each enhancement magnet aligned with transverse magnetic poles relative to the adjacent bar magnet.

11. The container for a bulk material of claim 8, further comprising a slide member coupled to the carriage surface configured with the same contour as one of the exterior wall and interior wall of the shell.

12. The container for a bulk material of claim 1, with the motion appliance comprising:
   a guide member positioned alongside and parallel to the exterior wall of the shell, with the guide member extending at least the full length of the shell and configured to receive and guide the driver assembly along the exterior wall of the shell; and
   a force transfer member coupled to a motor and the driver assembly.

13. The container for a bulk material of claim 12, wherein the motor is one of an electric motor, a hydraulic motor, and a pneumatic motor.

14. The container for a bulk material of claim 12, wherein the force transfer member is one of a chain, a belt, and a cable.

15. The container for a bulk material of claim 12, wherein the guide member is coupled to the exterior wall of the shell.

16. The container for a bulk material of claim 12, wherein the guide member is one of a rail and a tube.

17. The container for a bulk material of claim 1, further comprising:
- at least one additional driver assembly located outside the shell and configured to move along an outer surface of the shell;
- at least one additional driven assembly located inside the shell and coupled to the scraper assembly, wherein each of the additional driver assembly and additional driven assembly includes one of a magnet and a magnetically attractable material wherein a magnetic coupling is established between the driver and driven assemblies; and
- at least one additional motion appliance coupled to the driver assembly and configured to move the driver assembly along the outer surface of the shell, wherein movement of the driver assembly outside the shell causes a corresponding movement of the driven assembly and coupled scraper assembly inside the shell in coordination with the other driver assembly, driven assembly, and motion appliance.

18. The container for a bulk material of claim 1, further comprising:
- a position sensor coupled to one of the driver assembly and driven assembly; and
- a controller coupled to the motion appliance and the position sensor, wherein the controller controls the position of the scraper assembly inside the shell.

19. A container for a bulk material having an interior surface, including a container interior bulk material movement system, the system comprising:
- a scraper assembly disposed in the container and configured to reciprocally move from one end to another end of the container;
- a driver assembly configured to move along an outer surface of the container;
- a driven assembly coupled to the scraper assembly, with the driven assembly in magnetic communication with the driver assembly;
- one of a magnet and a magnetically attractable material disposed in each of the driver assembly and driven assembly wherein a magnetic coupling is established between the driver and driven assemblies; and
- a motion appliance exterior to the container including a motor and a force transfer mechanism extending along the container and coupled to the driver assembly and configured to move the driver assembly along the outer surface of the container, wherein movement of the driver assembly outside the container causes a corresponding movement of the driven assembly and coupled scraper assembly inside the container to move the bulk material inside the container;

wherein the scraper assembly includes a framework and a scraper portion conforming to a portion of the interior surface of the container; and wherein the driver assembly and driven assembly each comprise:
- a carriage defining a slot with at least one surface of each carriage configured with the same contour as one of the exterior wall and interior wall of the container, with the one of a magnet and a magnetically attractable material disposed in each slot with one surface of the one of the magnet and the magnetically attractable material configured with the same contour as the one surface of the carriage.

20. The container for a bulk material of claim 19, wherein each carriage defines a plurality of slots with one of the magnet and the magnetically attractable material disposed in each slot.

21. The container for a bulk material of claim 20, wherein all of the slots contain a bar magnet, with the bar magnets arranged with alternating poles aligned toward the wall of the container.

22. The container for bulk material of claim 21, further comprising a Halbach array arrangement, wherein an enhancement magnet is disposed between the bar magnets with each enhancement magnet aligned with transverse magnetic poles relative to the adjacent bar magnet.

23. The container for a bulk material of claim 19, with the motion appliance comprising:
- a guide member positioned alongside and parallel to the exterior wall of the container, with the guide member extending the full length of the container and configured to receive and guide the driver assembly along the exterior wall of the container; and wherein the force transfer member is coupled to the motor and the driver assembly.

24. The container for a bulk material of claim 23, wherein the guide member is coupled to the exterior wall of the container and wherein the guide member is one of a rail and a tube.

25. The container for a bulk material of claim 19, further comprising:
- a position sensor coupled to one of the driver assembly and driven assembly; and
- a controller coupled to the motion appliance and the position sensor, wherein the controller controls the position of the scraper assembly inside the container.

* * * * *